(12) United States Patent
Prior et al.

(10) Patent No.: US 10,006,464 B2
(45) Date of Patent: Jun. 26, 2018

(54) ELECTRIC BLOWER OPERABLE TO PROVIDE COMBUSTION AIR TO A FIRE

(71) Applicant: Archipelago Group LLC, Lakewood, CO (US)

(72) Inventors: Bruce Prior, Lakewood, CO (US); George Prior, Culver City, CA (US)

(73) Assignee: ARCHIPELAGO GROUP LLC, Lakewood, CO (US)

( * ) Notice: Subject to any disclaimer, the term of this patent is extended or adjusted under 35 U.S.C. 154(b) by 195 days.

(21) Appl. No.: 14/370,457

(22) PCT Filed: Jan. 4, 2013

(86) PCT No.: PCT/US2013/020379
§ 371 (c)(1),
(2) Date: Jul. 2, 2014

(87) PCT Pub. No.: WO2013/103887
PCT Pub. Date: Jul. 11, 2013

(65) Prior Publication Data
US 2014/0369867 A1   Dec. 18, 2014

Related U.S. Application Data

(63) Continuation of application No. 13/344,472, filed on Jan. 5, 2012, now Pat. No. 9,303,652.

(51) Int. Cl.
*F04D 25/06* (2006.01)
*F04D 25/08* (2006.01)
(Continued)

(52) U.S. Cl.
CPC .......... *F04D 25/08* (2013.01); *A47J 37/0754* (2013.01); *F04D 13/068* (2013.01);
(Continued)

(58) Field of Classification Search
CPC .... F04D 25/08; F04D 25/0673; F04D 25/084; F04D 13/06; F04D 13/068; F04D 29/601; A47J 37/0754
See application file for complete search history.

(56) References Cited

U.S. PATENT DOCUMENTS 1,108,053 A     8/1914  Wiwi et al.
2,591,669 A *   4/1952  Bucknell ................ A45D 20/12
                                                            219/242
(Continued)

FOREIGN PATENT DOCUMENTS

CH              552773 A    8/1974

OTHER PUBLICATIONS

International Search Report pertaining to International Application No. PCT/US2013/020379.

*Primary Examiner* — Peter J Bertheaud
*Assistant Examiner* — Christopher Bobish
(74) *Attorney, Agent, or Firm* — Olav M. Underdal; IDP Patent Services

(57) ABSTRACT

A blower for use to provide combustion air to a fire (e.g., to assist in the lighting of a fire). The blower may include a cylindrical housing having an inlet opening and an outlet opening with a bore extending between the inlet and the outlet. A fan and power source may be provided to induce air flow from the inlet opening and through the bore such that air is expelled from the outlet opening. The outlet air exiting the outlet opening may travel in a direction substantially parallel with a central axis of the cylindrical housing. The blower may be supported by an infinitely adjustable flexible member that may be manipulated to position the blower with respect to the fire to provide outlet air to the fire. The flexible member may be engaged with a clip to attach the blower to a structure adjacent to the fire.

22 Claims, 13 Drawing Sheets

(51) Int. Cl.
*F04D 29/64* (2006.01)
*F04D 13/06* (2006.01)
*F23B 90/02* (2011.01)
*F04D 29/60* (2006.01)
*A47J 37/07* (2006.01)
*F24B 1/19* (2006.01)

(52) U.S. Cl.
CPC ....... *F04D 25/0673* (2013.01); *F04D 29/601* (2013.01); *F04D 29/646* (2013.01); *F23B 90/02* (2013.01); *F24B 1/19* (2013.01); *F04D 13/06* (2013.01); *F04D 25/084* (2013.01)

(56) References Cited

U.S. PATENT DOCUMENTS

| | | | |
|---|---|---|---|
| D191,108 S | 8/1961 | Dahlen | |
| 3,096,933 A * | 7/1963 | Bora | B08B 15/04 |
| | | | 248/186.1 |
| 3,191,556 A | 1/1965 | Hottenroth et al. | |
| 3,362,586 A | 1/1968 | Dedoes | |
| 3,697,198 A * | 10/1972 | Holder, Jr. | A47J 37/0754 |
| | | | 110/327 |
| 4,044,750 A | 8/1977 | Zeigler | |
| 4,190,034 A | 2/1980 | Wonisch | |
| 4,734,017 A | 3/1988 | Levin | |
| 4,799,858 A * | 1/1989 | Shin-Chin | F04D 29/646 |
| | | | 248/231.51 |
| 4,809,399 A | 3/1989 | Hersker | |
| 4,810,173 A | 3/1989 | Thomson et al. | |
| 4,850,804 A * | 7/1989 | Huang | F04D 29/601 |
| | | | 248/278.1 |
| 4,884,314 A | 12/1989 | Miner | |
| 4,934,222 A | 6/1990 | Rittman et al. | |
| 5,115,566 A | 5/1992 | Zeitlin | |
| 5,256,039 A * | 10/1993 | Crawford | F04D 27/00 |
| | | | 416/100 |
| 5,341,578 A | 8/1994 | Anderson | |
| 5,394,620 A * | 3/1995 | Chimera | A45D 20/30 |
| | | | 34/97 |
| 5,397,268 A * | 3/1995 | Chang | A45B 3/00 |
| | | | 297/184.1 |
| 5,547,343 A * | 8/1996 | Jane | F04D 29/601 |
| | | | 248/231.51 |
| 5,658,128 A | 8/1997 | Green | |
| 5,725,356 A | 3/1998 | Carter | |
| 5,839,204 A | 11/1998 | Cinque et al. | |
| 5,873,178 A | 2/1999 | Johnson | |
| 5,890,882 A | 4/1999 | Feldman | |
| 5,940,980 A * | 8/1999 | Lee | A45D 20/12 |
| | | | 248/229.14 |
| 6,175,998 B1 | 1/2001 | Leo | |
| D462,775 S | 9/2002 | Minor | |
| 6,571,788 B1 | 6/2003 | Goldstein | |
| 6,615,820 B1 | 9/2003 | Ferreira | |
| D487,688 S | 3/2004 | Brass et al. | |
| D515,386 S | 2/2006 | Noniewicz et al. | |
| 7,028,992 B2 | 4/2006 | Rajendren | |
| 7,165,762 B1 | 1/2007 | Duzick | |
| 7,441,313 B2 | 10/2008 | Degen | |
| 7,455,582 B2 * | 11/2008 | Barrett | E04H 1/1216 |
| | | | 135/91 |
| 7,471,883 B2 * | 12/2008 | Seutter | A47K 10/48 |
| | | | 34/90 |
| D625,978 S | 10/2010 | Zeng | |
| 8,047,671 B2 * | 11/2011 | Fan | F21L 4/00 |
| | | | 362/119 |
| D675,312 S * | 1/2013 | Zhu | F04D 13/06 |
| | | | D23/370 |
| D684,924 S * | 6/2013 | Herbst | F04D 13/06 |
| | | | D13/103 |
| 2006/0098961 A1 | 5/2006 | Seutter et al. | |
| 2007/0044784 A1* | 3/2007 | Thompson | A47J 37/079 |
| | | | 126/25 B |
| 2007/0094884 A1 | 5/2007 | Micheludis | |
| 2008/0168977 A1* | 7/2008 | Daud | A47J 37/0754 |
| | | | 126/25 B |
| 2010/0016251 A1 | 7/2010 | Ward | |
| 2011/0041354 A1 | 2/2011 | Williams | |
| 2011/0081242 A1* | 4/2011 | Reuter | F04D 13/06 |
| | | | 415/222 |

* cited by examiner

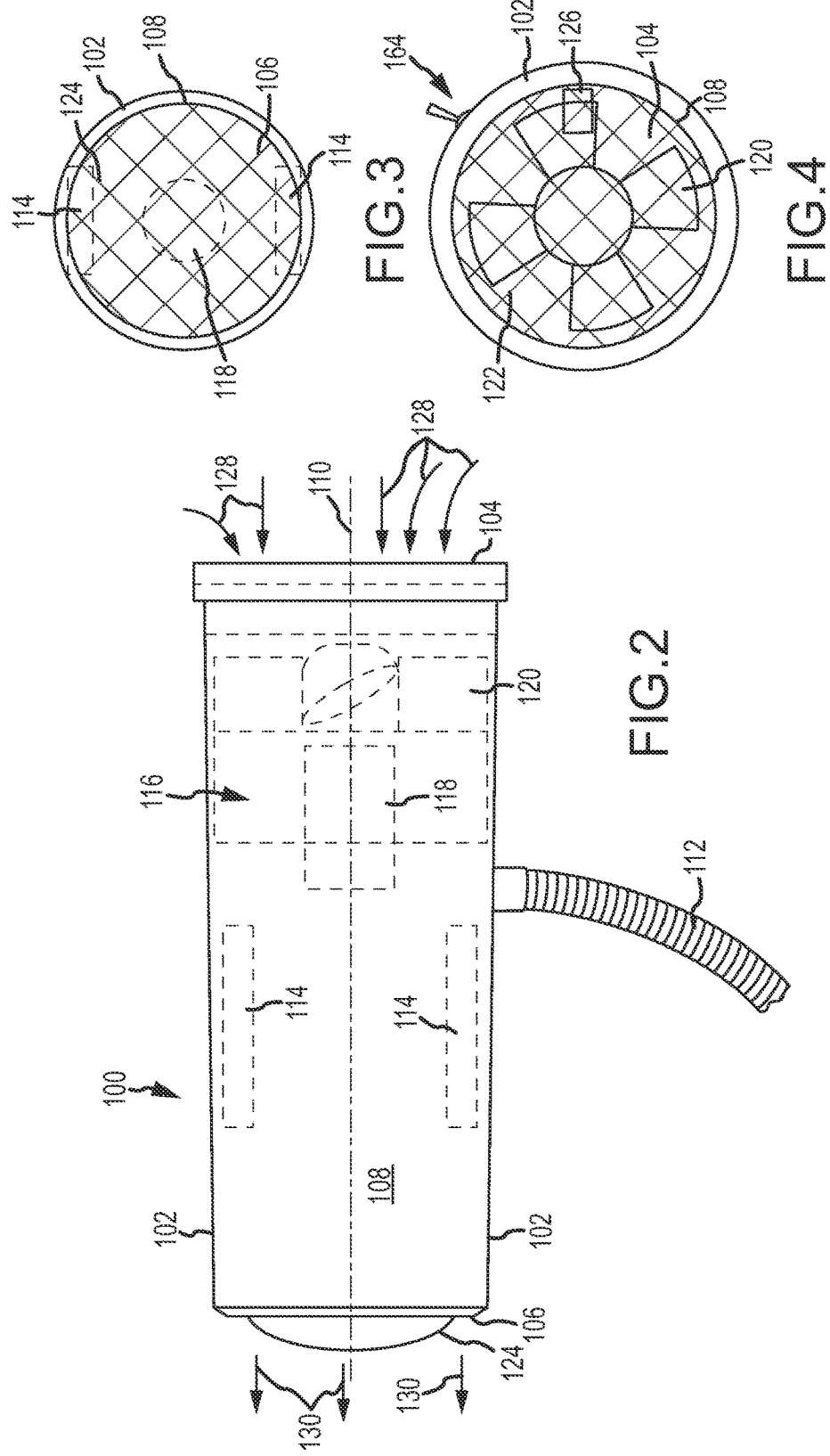

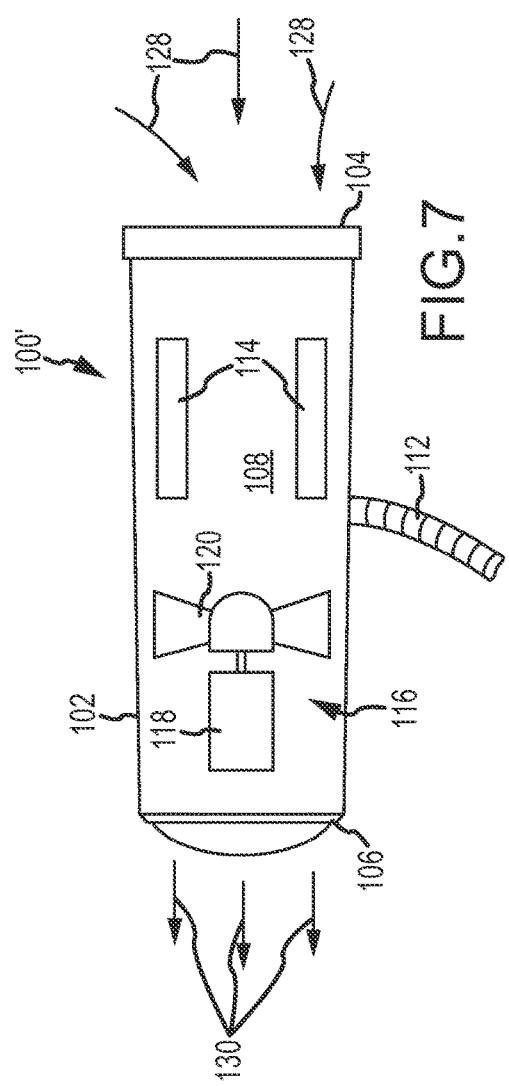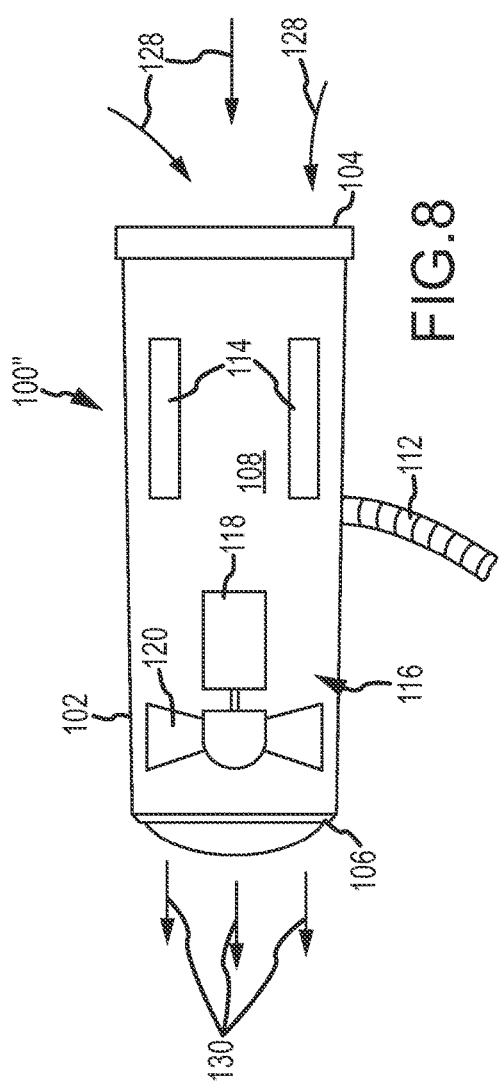

ELECTRIC BLOWER OPERABLE TO PROVIDE COMBUSTION AIR TO A FIRE

CROSS-REFERENCE TO RELATED APPLICATION

This application claims priority from U.S. Ser. No. 13/344,472, entitled: "ELECTRIC BLOWER OPERABLE TO PROVIDE COMBUSTION AIR TO A FIRE," filed on Jan. 5, 2012, the contents of which are incorporated herein by reference as if set forth in full.

BACKGROUND

It is often desirable to accelerate the combustion process of a fire (e.g., when lighting the fire). For example, accelerating a fire may be desired in the context of starting a charcoal grill, fireplace, wood-stove, campfire, or other fire. Blowing air on a fire is an established method of increasing the rate of combustion in that the amount of available oxygen supplied to the burning fuel is increased. For example, a traditional fireplace tool, though less frequently seen today, is a simple "bellows" that is used to direct air towards burning tinder while starting a fireplace fire. However, traditional bellows are bulky, require two hands to operate, and blow air in low volume, high velocity spurts. This may result in extinguishing any fire that has been established or may dangerously blow ash or embers from the fire.

One common example of where it is desirable to increase the rate of combustion of a fire is during the lighting of a charcoal grill. Some individuals who would otherwise like to enjoy the taste of food cooked on a charcoal grill may use gas grills (e.g., propane grills) instead of a charcoal grill because of the difficulty and time requirements of cooking on charcoal. For example, it may take too long to establish the coals of a charcoal fire for cooking. Some methods have been proposed to speed the lighting of charcoal, such as, for example, starter chimneys, electric heaters, and the use of blowers that are not specifically designed for operation to aid in combustion (e.g., hairdryers and the like). However, each of the foregoing fails to provide a simple, safe, and effective method for assisting in the lighting of a fire. Accordingly, those individuals that would otherwise enjoy the use of a charcoal grill turn to other cooking methods, such as propane grills, due to the hassle of lighting charcoal grills.

SUMMARY

In light of the foregoing, the present disclosure is generally related to an efficient, easy to use electric blower that is operable to provide combustion air to a fire. Unlike previous approaches, the electric blower of the present invention provides a safe, convenient way of accelerating the combustion of a fire so as to facilitate quicker start times for charcoal grills, fireplaces, wood stoves, campfires, or the like. The electric blower of the present disclosure may securely be attached to a structure adjacent to the fire to provide a low velocity, high volume supply of combustion air to a fire. Accordingly, the electric blower may facilitate the acceleration combustion to rapidly establish a fire for the purposes of for example, warmth or cooking.

A first aspect disclosed herein includes an electric blower operable to provide combustion air to a fire. The blower includes a cylindrical housing defining a bore extending from an inlet opening of the housing to an outlet opening of the housing. The bore extends along at least a portion of a central axis of the cylindrical housing. The blower also includes a fan assembly disposed within the bore between the inlet opening and the outlet opening. The fan assembly has an axis of rotation substantially coaxial with the central axis. The blower also includes a power source that is disposed in the bore and is in operative communication with the fan assembly to power the fan assembly. The fan assembly is rotatable about the axis of rotation to induce air flow through the bore between the inlet opening and the outlet opening such that air is expelled from the outlet opening in a direction substantially parallel with the central axis. The cylindrical housing is positionable with respect to the fire to direct air toward the fire, thus providing combustion air to the fire.

A number of feature refinements and additional features are applicable to the first aspect. These feature refinements and additional features may be used individually or in any combination. As such, each of the following features that will be discussed may be, but are not required to be, used with any other feature or combination of features of the first aspect described above.

For example, in one embodiment the cylindrical housing may be operatively connected to a flexible member for supportive engagement of the cylindrical housing by the flexible member. The flexible member may be manipulable to position the cylindrical housing with respect to the fire so as to direct air exiting the outlet opening travels toward the fire. The cylindrical housing may be positionable at least by way of one of translation of the cylindrical housing in a direction transverse to the central axis, translation of the cylindrical housing in a direction along the central axis, or rotation of the cylindrical housing about a rotation axis transverse to the central axis. Accordingly, the flexible member may be infinitely adjustable to define a continuum of blower positions.

In an embodiment, the flexible member may be operatively engaged with a clip for selective attachment of the electric blower to a support structure. The clip may comprise a clamp member having opposing jaws members pivotal about a hinge. A jaw opening centerline may be defined between the hinge and an interface of the opposing jaw members when closed, and the clip may comprise handle portions extending in a direction extending away from the jaw opening centerline.

In another embodiment, the power source may comprise at least one battery. The at least one battery may be rechargeable. Additionally or alternatively, the fan assembly and the power source may comprise a removable unit that is selectively removable from the cylindrical housing. As such, the power source may be removed from the cylindrical housing for replacement (e.g., with standard sized batteries such as AAA, AA, C, or D sized batteries).

In one embodiment, the inlet opening may be disposed at a first end portion of the cylindrical housing and the outlet opening may be disposed at a second end portion of the cylindrical housing opposite the first end portion. As such, when the cylindrical housing is positioned with respect to the fire so as to direct air exiting the outlet opening toward the fire, the inlet opening may be disposed further from the fire than the outlet opening. The inlet opening may comprise substantially the entire cross sectional area of the cylindrical housing at the first end portion and the outlet opening may comprise substantially the entire cross sectional area of the cylindrical housing at the second end portion. In one embodiment, the outlet opening may be smaller than the inlet opening.

The blower may be adapted for indoor or outdoor use. In this regard, the blower may be constructed such that the blower is capable of withstanding relatively harsh outdoor conditions. For example, the cylindrical housing may comprise stainless steel. Furthermore, the blower may be electrically insulated such that the power source and fan assembly may be exposed to weather conditions commonly experienced outdoors (e.g., rain, snow, or other moisture) and remain operable in a safe manner, i.e., without the risk of electric shock.

In still another embodiment, the blower may include a fan controller in operative communication with the fan assembly that is operable to control the speed of the fan assembly.

Another aspect included herein is a method for providing combustion air to a fire. The method includes securing an electric blower to a structure adjacent to the fire. The electric blower provided may be as described above with respect to the first aspect. That is, the electric blower of the second aspect includes a cylindrical housing defining a bore extending from an inlet opening of the housing to an outlet opening of the housing such that the bore extends along at least a portion of the central axis of a cylindrical housing. The method further includes operating a fan assembly disposed within the bore between the inlet opening and the outlet opening, wherein the fan assembly has an axis of rotation substantially coaxial with the central axis. The method further includes inducing air flow through the bore between the inlet opening and the outlet opening in response to the operating such that air is expelled from the outlet opening in a direction substantially parallel with the central axis. The method further includes positioning the cylindrical housing with respect to the fire such that the air expelled from the outlet opening is directed toward the fire.

A number of feature refinements and additional features are applicable to the second aspect of the present invention. These feature refinements and additional features may be used individually or in any combination. As such, each of the following features that will be discussed may be, but are not required to be, used with any other feature or combination of features of the second aspect.

For example, the securing may include attaching a clip to the structure. The clip may be operatively connected to the cylindrical housing by way of a flexible member extending therebetween. Additionally, the positioning may include manipulation of the flexible member. In any regard, the positioning may include at least one of translation of the cylindrical housing in a direction transverse to the central axis, translation of the cylindrical housing in a direction along the central axis, or rotation of the cylindrical housing about a rotation axis transverse to the central axis.

A third aspect includes an electric blower operable to provide combustion air to a fire. The blower includes a cylindrical housing defining a bore extending from an inlet opening of the housing to an outlet opening of the housing. The bore extends along at least a portion of a central axis of the cylindrical housing. The blower also includes a fan disposed within the bore between the inlet opening and the outlet opening, the fan having an axis of rotation substantially coaxial with the central axis. The blower further includes a power source disposed remotely from the fan and in operative communication with the fan to power the fan. As such, the fan is rotatable about the axis of rotation to induce air flow through the bore between the inlet opening and the outlet opening such that air is expelled from the outlet opening in a direction substantially parallel with the central axis and the cylindrical housing is positionable with respect to the fire to direct air toward the fire.

A number of feature refinements and additional features are applicable to the second aspect of the present invention. These feature refinements and additional features may be used individually or in any combination. As such, each of the following features that will be discussed may be, but are not required to be, used with any other feature or combination of features of the second aspect.

For example, the cylindrical housing may be operatively connected to a flexible member for supportive engagement of the cylindrical housing by the flexible member. The flexible member may be manipulable to position the cylindrical housing with respect to the fire so as to direct air exiting the outlet opening travels toward the fire. The cylindrical housing may be positionable at least with respect to one of translation of the cylindrical housing in a direction transverse to the central axis, translation of the cylindrical housing in a direction along the central axis, or rotation of the cylindrical housing about a rotation axis transverse to the central axis. In this regard, the flexible member may be infinitely adjustable to define a continuum of blower positions.

In an embodiment, the power may be is located outside of the cylindrical housing. For example, in an embodiment the flexible member may be operatively engaged with a clip for selective attachment of the electric blower to a support structure, and the clip may comprises the power source. The clip may include a clamp having opposing jaws pivotal about a hinge, wherein a jaw opening centerline is defined between the hinge and an interface of the opposing jaws when closed, wherein the clip comprises handles extending in a direction extending away from the jaw opening centerline.

In this regard, the power source may be disposed within at least one of the handles. For example, the power source may include at least one battery, wherein the at least one battery is disposed within a volume defined by at least one of the handles. Furthermore, a power cable may extend from the clip to the fan. For example, the power cable may extend along the flexible member. In an embodiment, the at least one battery may be rechargeable.

Additionally, the inlet opening may be disposed at a first end portion of the cylindrical housing and the outlet opening is disposed at a second end portion of the cylindrical housing opposite the first end portion. In this regard, when the cylindrical housing is positioned with respect to the fire so as to direct air exiting the outlet opening toward the fire, the inlet opening may be disposed further from the fire than the outlet opening. Furthermore, the inlet opening may include substantially the entire cross sectional area of the cylindrical housing at the first end portion and the outlet opening comprises substantially the entire cross sectional area of the cylindrical housing at the second end portion. In an embodiment, the outlet opening may be smaller than the inlet opening.

In an embodiment, the blower maybe constructed from materials that resist degradation in outdoor environments. For example, the cylindrical housing may comprise stainless steel, aluminum, or another appropriate material (e.g., a polymer).

In an embodiment, a fan controller may be provided that may be in operative communication with the fan that is operable to control the speed of the fan. The fan controller may provide continuously variable control over the speed of the fan. In an embodiment, the fan controller is disposed in the clip.

In an embodiment, the clip may include a recessed portion adaptable to receive a portion of a structure with which the clip is engaged. The recessed portion may include a cam surface for engaging the portion of the structure to resist movement of the clip relative to the structure. In this regard, the weight of the handles pivots the cam surface in contacting engagement with the portion of the structure.

In an embodiment, the handles may include a stamped portion. As such, a housing may be attachably engaged with the stamped portion. The housing may, at least partially, contain the power source.

A fourth aspect includes an electric blower operable to provide combustion air to a fire comprising a clip for attachment to a structure adjacent to the fire, a power supply integrally provided with the clip, and a blower supportably engaged with the clip and comprising a fan in electrical communication with the power supply. The blower may be selectively positionable independent from the clip to direct air toward the fire in response to operation of the fan.

BRIEF DESCRIPTION OF THE DRAWINGS

In the accompanying figures, like reference numerals refer to like elements throughout the figures.

FIG. 2 depicts a cross-sectional view of the embodiment of a blower shown in FIG. 1.

FIG. 3 depicts a left end view of an outlet opening of the embodiment of a blower shown in FIG. 1.

FIG. 4 depicts a right end view of an inlet opening of the embodiment of a blower shown in FIG. 1.

FIG. 7 depicts a cross sectional view of another embodiment of a blower.

FIG. 8 depicts a cross sectional view of another embodiment of a blower.

DETAILED DESCRIPTION

The following description is not intended to limit the invention to the form disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
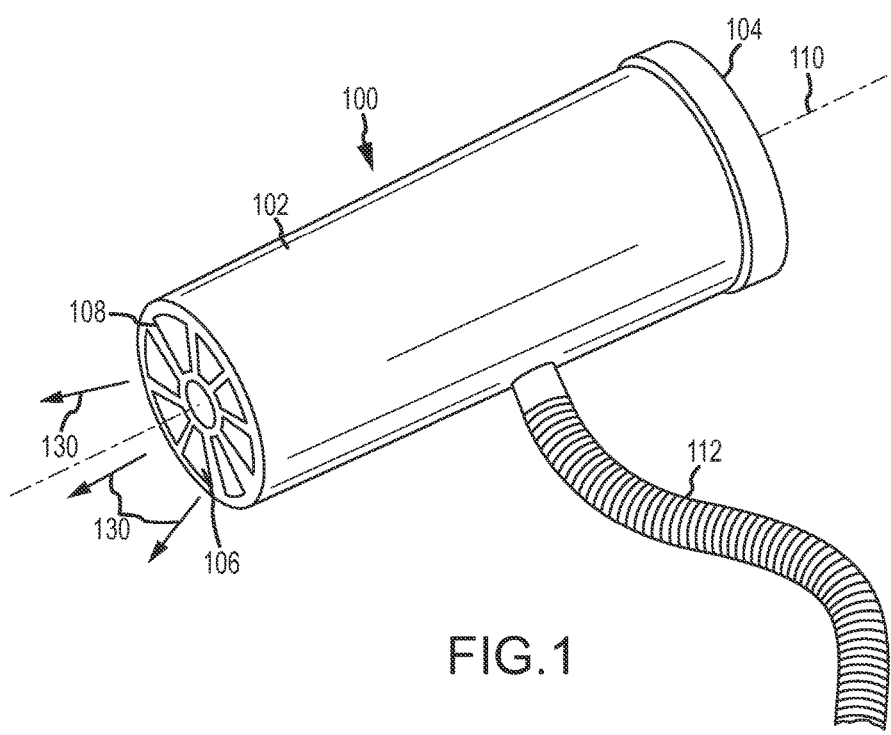
FIG. 1 depicts a perspective view of an embodiment of a blower.

FIG. 1 illustrates one embodiment of blower 100. The blower 100 may include a cylindrical housing 102 that is supportively engaged by a flexible member 112. The cylindrical housing 102 includes central axis 110. On a first end of the cylindrical housing 102 there may be an inlet opening 104. On a second end opposite to the first end, may be an outlet opening 106. A bore 108 may extend through the cylindrical housing 102 between the inlet opening 104 and the outlet opening 106 (e.g., along the central axis 110). In this regard, a fan 116 (shown in FIG. 2) disposed within the bore 108 may be operative to draw air into the inlet opening 104 and induce air flow through the bore 108 such that it exits the outlet opening 106. The outlet air 130 may exit the outlet opening 106 in a direction substantially parallel with the central axis 110 (e.g., at least in the plane of the outlet opening 106). In this regard, the cylindrical housing 102 may be positioned by manipulating the flexible member 112 such that the central axis 110 is directed toward (e.g., aimed at) a fire to be stoked. As such, the fan 116 may act to provide outlet air 130 in the direction of the fire such that the fire may be supplied with additional air to accelerate combustion.

In one embodiment, the cylindrical housing 102 may have a length of not less than about 4 inches (10.2 cm) and not more than about 10 inches (25.4 cm). In a particular embodiment, the cylindrical housing 102 may have a length of approximately 7 inches (17.8 cm). In another embodiment, the cylindrical housing 102 may have a length of approximately 5 inches (12.7 cm). Additionally, in an embodiment the inlet opening 104 may be larger than the outlet opening 106. For example, the inlet opening may be about 2.75 inches (7 cm) in diameter and the outlet opening may be about 2.5 inches (6.4 cm) in diameter. In an embodiment, the inlet opening 104 may be not less than about 2 inches (5 cm) and not greater than about 4 inches (10 cm). The outlet opening 104 may be not less than about 2.5 inches (6.4 cm) and not greater than about 5 inches (12.7 cm). In still another embodiment, the inlet opening 104 and the outlet opening 106 may be approximately the same size. In this regard, the cylindrical housing 102 may have a substantially constant cross sectional size along the length of the cylindrical housing 102. For example, the cylindrical housing 102 may have a diameter of not less than about 2 inches (5 cm) and not greater than about 4 inches (10 cm). In an embodiment, the diameter of the cylindrical housing 102 may be about 2.5 inches (6.4 cm).

In any regard, the use of the blower 100 may present advantages over traditional devices (e.g., bellows, etc.) used to accelerate combustion. As described above, bellows and other traditional methods of circulating more air toward a fire (e.g., fanning, blowing, etc.) often provide less than ideal circulation of air to accelerate combustion. For example, these traditional methods may result in an insufficient amount of air circulating in the vicinity of the fire. Alternatively, the air circulated by traditional methods may result in a low volume of air delivered in a narrow, high-speed column of air that is limited to a very localized area of the fire and may result in embers, ash, or other debris being generated.

In contrast, the blower assembly 100 may deliver a relatively high volume of air to stoke a fire at relatively low speeds to avoid the generation of embers, ash, or other debris. That is, sufficient air is circulated in the area of the fire, yet the likelihood of ashes or embers being generated is reduced. Furthermore, the low speed of the air being circulated reduces the potential that any combustion present is extinguished as may happen when delivering low volume, high speed columns of air.

With further reference to FIGS. 2-4, a cross sectional view of the blower 100 (FIG. 2) along with left (FIG. 3) and right (FIG. 4) end views depicting the outlet opening 106 and inlet opening 108, respectively are shown. The fan 116 may include an electric motor 118 and a fan blade member 120. The fan blade member 120 may be attached to an output shaft of the electric motor 118. In an embodiment, there may also be a power source 114 disposed within the bore 108 of the cylindrical housing 102. For example, the power source 114 may be disposed adjacent to a sidewall of the bore 108. The power source 114 may be in operative communication with the electric motor 118. In this regard, the power source 114 may be selectively controlled to supply power to the electric motor 118 in order to rotate the fan blade member 120. The fan 116 may be oriented within the bore 108 such that the axis rotation of the fan 116 is parallel (i.e., substantially co-axial) with the central axis 110 of the bore 108.

As depicted in FIG. 2, the fan 116 may be positioned adjacent to the inlet opening 104. Additionally, the fan blade member 120 may be positioned in the bore 108 upstream with respect to the electric motor 118. As used herein, upstream and downstream may refer to the flow of air through the bore 108 when the fan 116 is in operation. Thus, a feature that is upstream of a referenced feature may be nearer to the inlet opening 104 than the referenced feature. A feature that is downstream of a referenced feature may be nearer to the outlet opening 106 than the referenced feature.

FIG. 3 depicts a left end view of the blower 100. Accordingly, the outlet opening 106 is depicted. The outlet opening 106 may be covered by an outlet grill 124. FIG. 4 depicts a right end view of the blower 100 such that an inlet opening 104 is depicted. The inlet opening 104 may include an inlet grill 122. The inlet and/or outlet grills 122 and 124 may prevent debris from entering and/or exiting the bore and may limit access to the interior of the bore 108. Also seen in FIG. 4 is a plug connector 126. The plug connector 126 may be in operative communication with the power source 114. In this regard, the plug connector 126 may be used to re-charge the power source 114.

FIG. 4 also depicts a speed controller 164. In one embodiment, the speed controller 164 may comprise at least one switch (e.g., a toggle switch or the like). The speed controller 164 may be accessible from an exterior of the cylindrical housing 102 and be manipulated to control the speed of the fan 116. For example, the speed controller 164 may be a multi position switch (e.g., having an "OFF", "HIGH", and "LOW" position). In this regard, the speed controller 164 may control the power delivered to the fan assembly 116 and thereby the speed of the fan assembly 116. Alternatively, the speed controller 164 may be continuously adjustable (e.g., a potentiometer, pulse wave generator, or the like). The speed controller 164 may employ a separate ON/OFF switch or provide ON/OFF control in a single continuously adjustable control switch.

Figure 5:
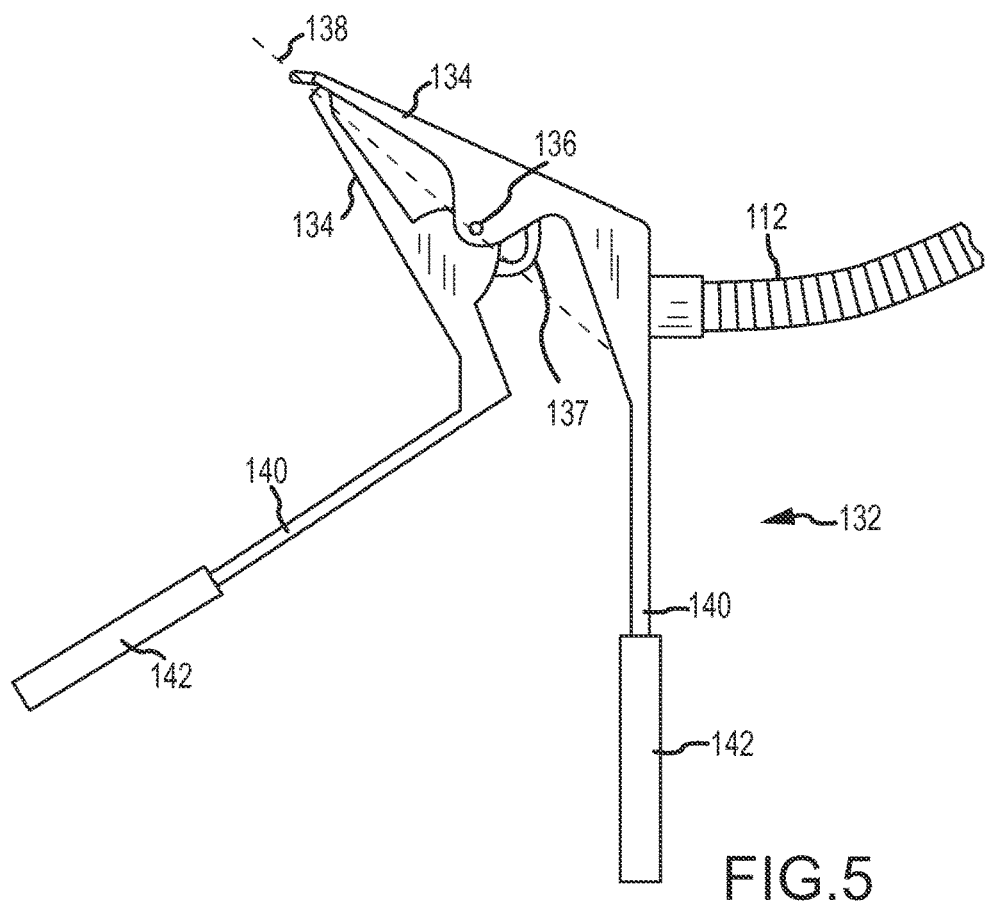
FIG. 5 depicts a side view of an embodiment of a clip.
Figure 6:
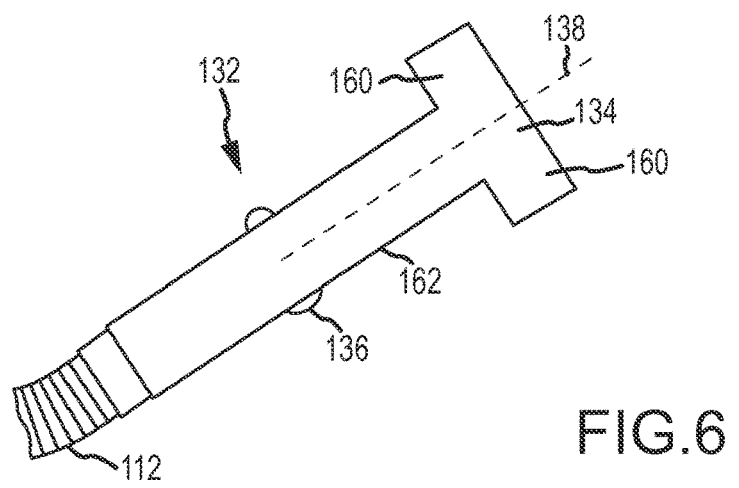
FIG. 6 depicts a top view of the embodiment of a clip shown in FIG. 5.

With additional reference to FIGS. 5 and 6, an embodiment of a clip 132 is depicted. The clip 132 may be used to secure the blower 100 to a structure adjacent to a fire. The clip 132 may be provided in operative engagement with the flexible member 112 (e.g., on an opposite end of the flexible member 112 as the blower 100). In this regard, the clip 132 may be used to attach the flexible member 112 and the blower 100 to a structure. For example, the structure to which the clip 132 and blower 100 are attached may be adjacent to a fire. In turn, the flexible member 112 may be manipulated to direct the flow of air exiting the blower 100 (e.g., generally along the central axis 110) with the fire. In this regard, the blower 100 may be positioned as described above such that the blower 100 is operative to induce airflow toward the fire.

The clip 132 may include opposing jaws 134. The opposing jaws 134 may be pivotal about a hinge 136. In this regard, a center line 138 of the jaw opening may extend between an interface of the opposing jaws 134 and the hinge 136 as depicted in FIG. 5. The jaws 134 may be biased to a closed position (e.g., by a spring 137 disposed at the hinge 136 or the like). Thus, the jaws 134 may be selectively opened so that the clip 132 may be placed on a structure. The clip 132 may also include handles 140. The handles 140 may be provided integrally with respective ones of the opposing jaws 134. In this regard, the handles 140 may be manipulated (e.g., squeezed together) so as to open the opposing jaws 134 for placement with respect to the structure. The handles 140 may be provided with heat insulation material 142. It will be appreciated that the structure to which the clip 132 is attached may be adjacent to the fire such that the structure and/or the clip 132 may be heated by the fire. In this regard, the handles 140 may become heated as well. The heat insulation material 142 provided on the handles 140 may provide some protection for a user manipulating the heated handles 140.

Furthermore, as depicted in FIG. 5, the handles 140 may extend in a direction generally away from the center line 138 of the jaw opening. In this regard, when the clip 132 is affixed to a structure adjacent a fire (e.g., charcoal grill), the handles 140 may extend away from the centerline of the jaw opening 138 and, thus be at least partially shielded from the fire. In this regard, the handles 140 may not be exposed to direct radiant heat from the fire as will be discussed further below with respect to FIG. 10. Furthermore, handles 140 may extend away from the jaws 134 and be shaped such that heat transfer to the end of the handles 140 adjacent the insulation material 142 is relatively low. For example, the handles 140 may extend away from the centerline 138 substantially perpendicularly such that the handles 140 and opposing jaws 134 are at a substantially right angle. Furthermore, the handles 140 may be, in one embodiment, at least 4 inches (10 cm) in length, and more preferably, at least 5 inches (12.7 cm) in length. In this regard, the handles 140 may be manipulated even when the clip 132 is positioned adjacent to the fire without becoming heated to the point where a user may not easily handle the handles 140.

With further respect to FIG. 6, a top view of the clip 132 is shown. In this regard, it may be appreciated that the opposing jaws 134 may be of a generally "T" shaped configuration such that the jaws 134 include projections 160 extending laterally away from the centerline 138 of the jaw opening. In this regard, the projections 160 may extend laterally beyond a jaw body 162 of either jaw 134.

In FIG. 2 described above, one potential configuration of the fan 116 is shown positioned in the bore 108 of the cylindrical housing 102. FIGS. 7 and 8 depict alternative potential arrangements of the fan 116 in the bore 108 with respect to blower 100' and blower 100". In FIG. 7 depicting an embodiment of the blower 100', the fan 116 may be positioned downstream of a power source 114 in the bore 108. The fan blade member 120 may be positioned upstream of the electric motor 118. As further depicted in the embodiment of the blower 100" shown in FIG. 8, the arrangement of the fan blade member 120 with respect to the electric motor 118 may be reversed such that the fan blade member 120 is positioned downstream of the electric motor 118 while the fan 116 is still downstream of the power source 114 in the bore 108. This alternative arrangement of the fan blade member 120 and electric motor 118 wherein the fan blade member 120 is downstream of the motor 118 may be used in either the case shown in FIG. 8 where the fan 116 is provided downstream of the power source 114 or in the arrangement shown in FIG. 2 wherein the fan 116 is positioned upstream from the power source 114.

In one embodiment, the electric motor 118 may be a 370 type DC motor with a voltage range of 2 to 13 volts. Accordingly, the fan 116 may rotate at speeds between about 5,000 rpm and about 30,000 rpm. In this regard, these speeds may provide a high volume of air at relatively low speeds that, as described above, may be advantageous. Furthermore, such speeds may allow for high efficiency operations and relatively low noise outputs.

Figure 9A:
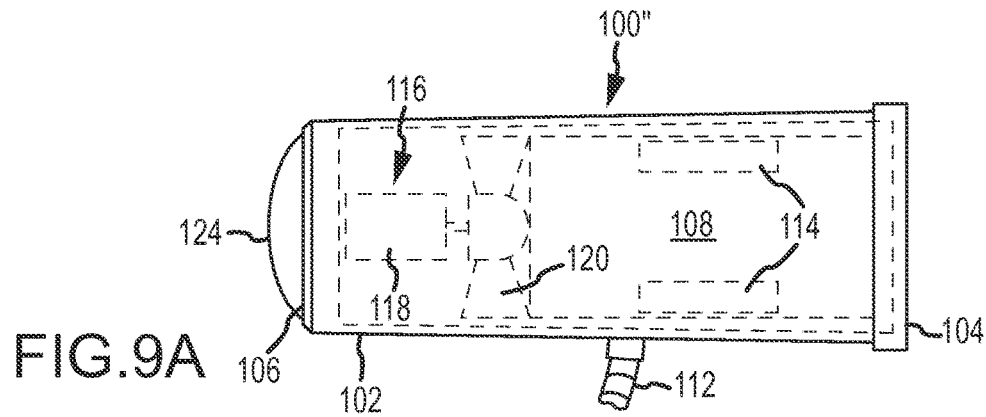
FIGS. 9A-9C depict a progression of a removable unit being removed from a cylindrical housing.
Figure 9B:
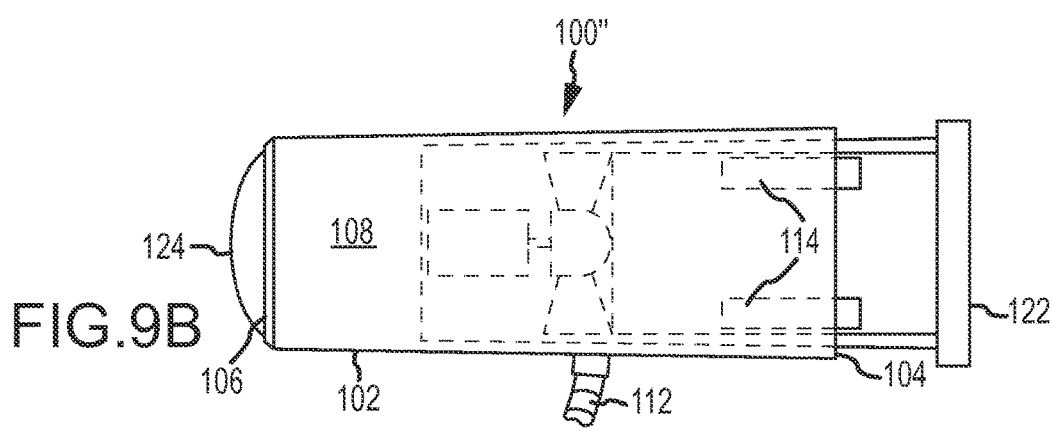
Figure 9C:
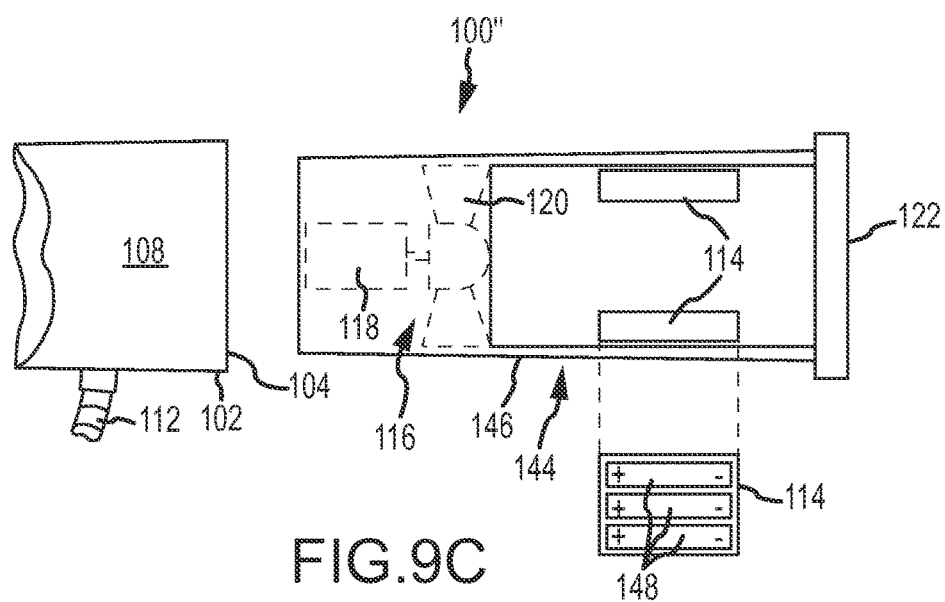

Regardless of this specific implementation of the position of the fan 116 in the bore 108, the fan 116 and the power source 114 may comprise a removable unit 144 that is disposed within the bore 118 as shown in FIG. 9C. With respect to FIGS. 9A-9C, one embodiment for the progression of the removal of the removable unit 144 is depicted. The fan 116 and the power source 114 may be provided on an inner chassis 146. For example, the inner chassis 146 may be a one-piece motor mount for supporting the electric motor 118 and a fan housing (e.g., including the inlet grill 122 or other structure for housing the fan blade assembly 120).

The inner chassis 146 may be disposed within the bore 108. For example, the inner chassis 146 may be dimensioned such that it is received in the bore 108 by way of an interference fit. Alternatively, engagement features may be provided relative to the bore 108 and/or the inner chassis 146 to facilitate retention of the inner chassis 146 within the bore 108. In any regard, the removable unit 144 may be slideably engaged with the bore 108, (e.g., in a direction towards the inlet opening 104). As such the removable unit 144 may be selectively removed from within the bore 108.

Once the removable unit 144 has been removed from the bore 108 as shown in FIG. 9C, the power source 114 may be readily accessible. As depicted, the power source 114 may comprise one or more batteries 148. Once the removable unit 144 has been removed from the bore 108, the power source 114 may be accessed such that the batteries 148 may be replaced. In this regard, the blower 100 may be portable, in that it does not require a wired connection to a power source. Moreover, the batteries 148 may be rechargeable such that, for example, the blower 100 may be provided with external power (e.g., via the plug connector 126 shown above in FIG. 4 to recharge the batteries). In one embodiment, the batteries 148 may comprise a plurality of AAA sized 1.2 V NiMH cells. Such batteries are readily available and economical. However, other size and types of batteries 148 may be provided. For example, lithium ion type batteries may be employed. Alternatively, the batteries 148 may be accessed by other mechanisms, e.g., a door, slot, or other selectively accessible feature.

Figure 10:
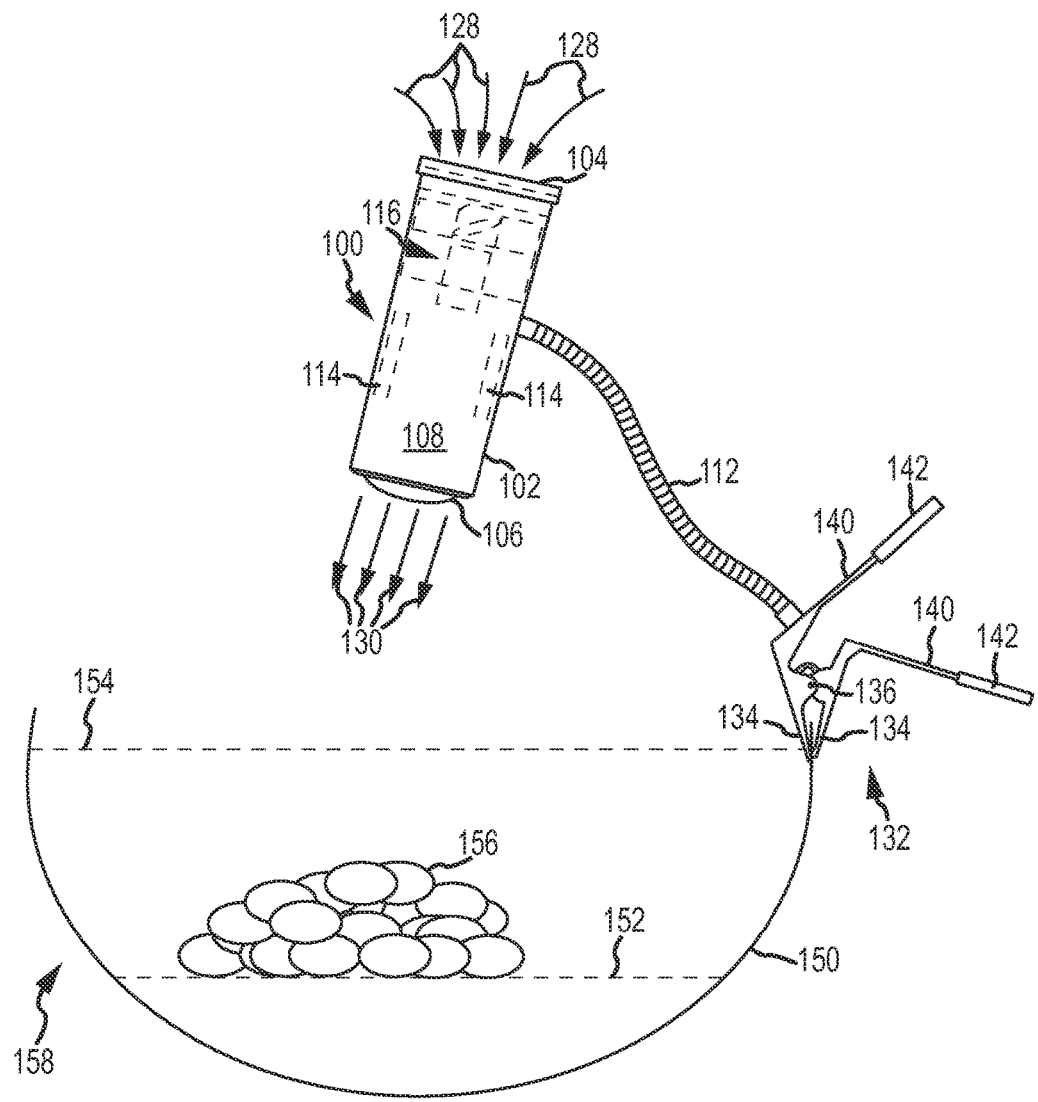
FIG. 10 depicts an embodiment of a blower and a clip in position on a charcoal grill.
Figure 11:
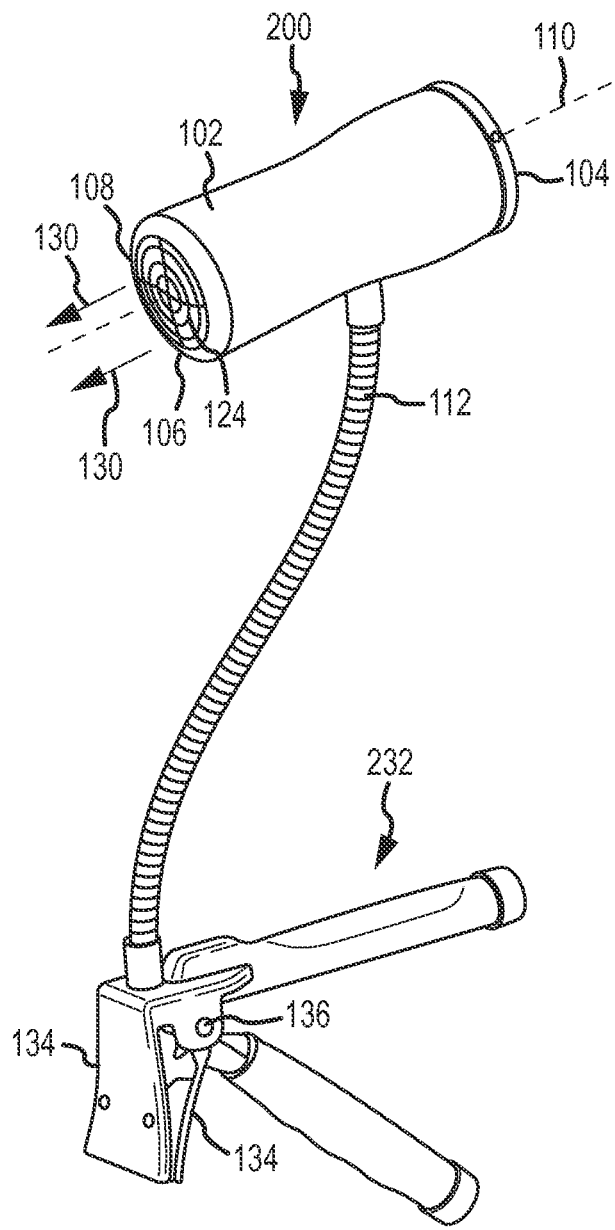
FIG. 11 depicts a perspective view of an embodiment of a blower and clip.
Figure 12:
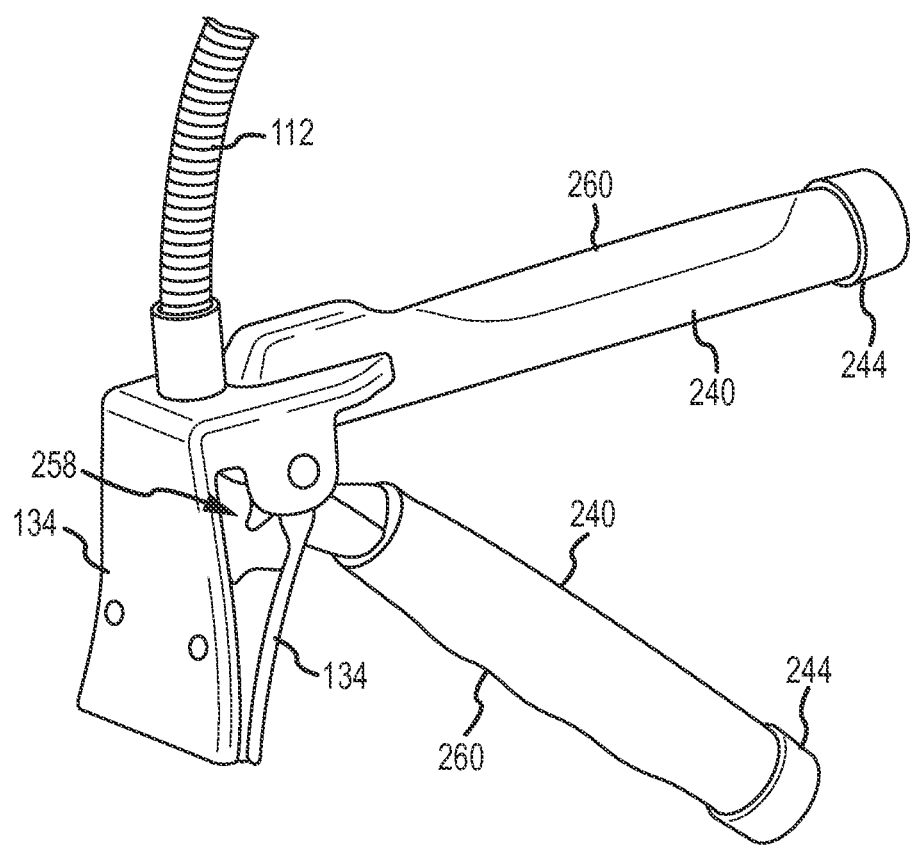
FIG. 12 depicts a perspective view of the clip of FIG. 11.
Figure 13:
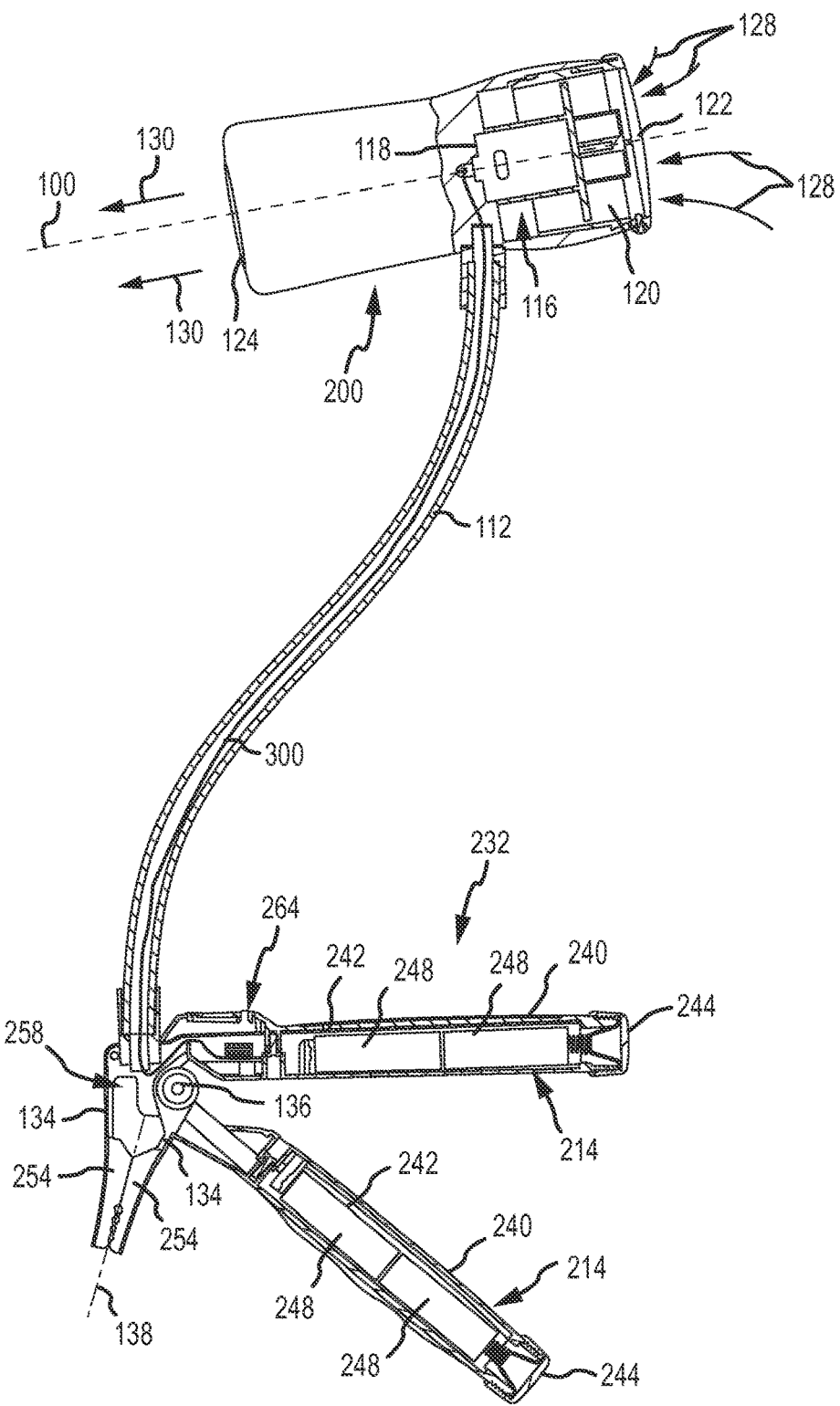
FIG. 13 depicts a cross sectional view of the embodiment of FIG. 11.
Figure 14:
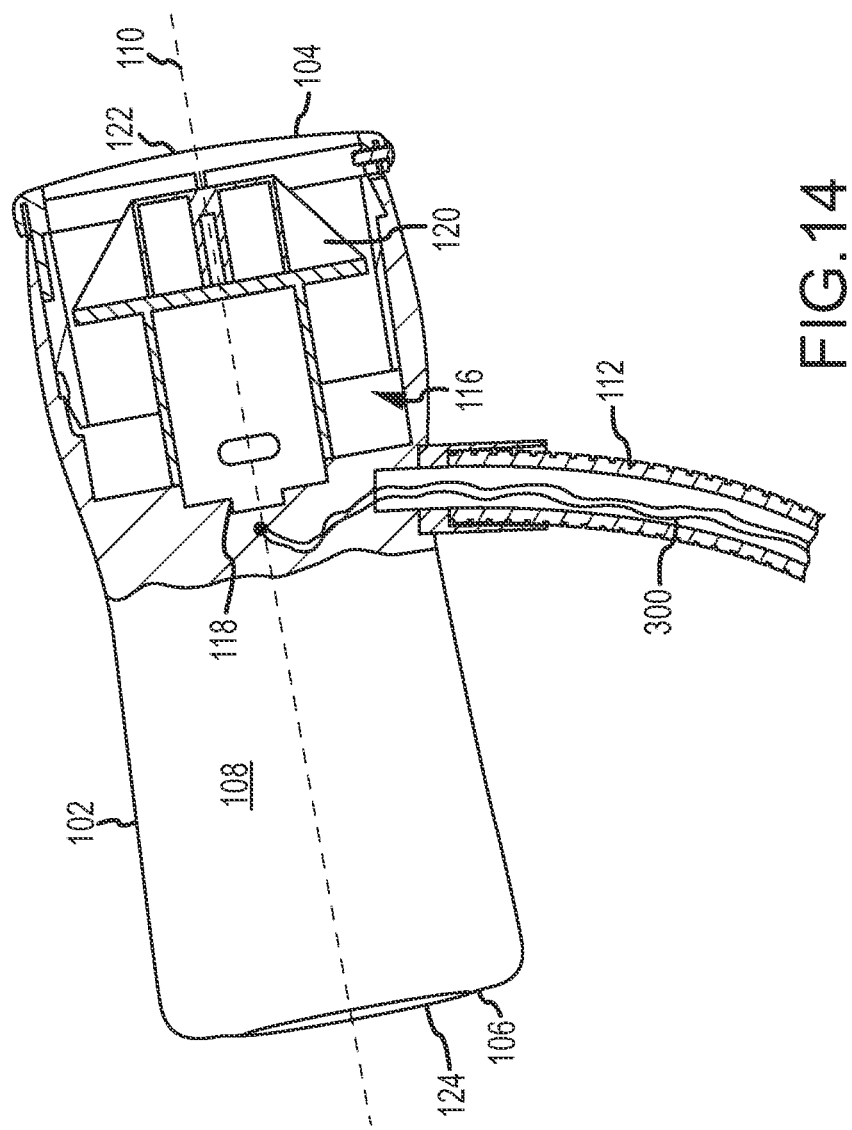
FIG. 14 depicts a cross sectional view of the embodiment of the blower of FIG. 11.

FIG. 10 depicts one embodiment of a blower 100 in use with a charcoal grill 158. The charcoal grill 158 may include a grill sidewall 150. The grill 150 may also include a charcoal grate 152 extending between opposing portions of the grill sidewall 150. A charcoal pile 156 may be provided on the charcoal grate 152. A cooking grate 154 may also extend between opposing portions of the charcoal sidewall 150. The charcoal pile 156 may be disposed on the charcoal grate 152 and below the cooking grate 154. In this regard, the charcoal pile 156 may be lit to provide heat for cooking on the cooking grate 154.

In order to accelerate the rate of combustion the charcoal pile 156 (e.g., to accelerate the rate at which the charcoal pile 156 becomes ready for cooking), the blower 100 may be secured to the sidewall 150 of the grill 158 by way of the clip 132. The flexible member 112 may supportably engage the blower 100 relative to the clip 132. In this regard, the blower 100 need not be held by a user while in use. For example, the blower 100 may be supported by the flexible member 112 such that the flexible member 112 is manipulated in order to position the blower 100 in a desired orientation. The blower 100 may be positioned by way of, for example, one or more of translation of the cylindrical housing 102 in a direction transverse to the central axis 110, translation of the cylindrical housing 102 in a direction along the central axis 110, or rotation of the cylindrical housing 102 about a rotation axis transverse to the central axis 110. Thus, a user may attend to other matters while the fire in the charcoal pile 156 is established.

As will be appreciated from FIG. 10, when the clip 132 is attached to the grill sidewall 150, the handles 140 may be disposed with respect to the charcoal pile 156 so as to minimize the exposure of the handles 140 to radiant heat generated by the charcoal pile 156. That is, one or both of the major surface areas of the handles 140 may be nearly or approximately parallel to the direction of the radiant heat generated by the burning charcoal pile 156. Additionally or alternatively, as can best be appreciated from the lower handle 140 of FIG. 10, the handle 140 may be arranged such that the grill sidewall 150 is disposed between the burning charcoal pile 156 and at least a portion of the handle 140 so as to reduce the amount of radiant heat from the charcoal pile 156 to which the handle 140 is exposed. Additionally, as described above, because the handles 140 may have a length of not less than 4 inches (10 cm), and more preferably not less than 5 inches (12.7 cm), the amount of heat that is conducted to the end portion of the handles 140 (e.g., adjacent to the heat insulation material 142) may be reduced. As such, the shape, size, and location of the clip 132 may reduce the amount of heat to which the handles 140 are exposed so as to maintain relatively low temperatures (i.e., those temperatures in the range that can safely be handled by a user without the use of additional heat protections devices).

The flexible member 112 may be a "gooseneck" type flexible metal tubing that is available in a variety of diameters. Flexible metal tubing of this type is available in a variety of stiffness values, and which can be bent into any shape or position up to a certain acute arc. The arc to which the flexible metal tubing may be shaped becomes more flat as the stiffness of the particular tubing increases. In one embodiment, the flexible member 112 may be approximately 12 inches (30 cm) in length. This may provide a sufficient amount of available deflection of the flexible member 112 to adjustably position the blower 100. However, other lengths of flexible members 112 may be provided, for example, between 4 inches (10 cm) and 24 inches (61 cm) in length. In one embodiment, the flexible member 112 may comprise a ⅝ inch (1.5 cm) diameter, medium stiffness gooseneck type metal tubing, which provides a workable combination of flexibility and stiffness to support the blower 100, while allowing adequate reach of the flexible member 112 to allow correct positioning of the blower 100 in a wide range of applications. However, the flexible member 112 may also have a different thickness, length, and/or stiffness, as the particular application and manufacturing considerations dictate.

The flexible member 112 may extend between the blower 100 and the clip 132 to supportably engage the blower 100. In this regard, the blower 100 may be positioned shown such that the outlet air 130 is directed towards the charcoal pile 156 in order to provide additional combustion air to the charcoal pile 156. It will be further appreciated that the inlet opening 104 is generally positioned away from the burning charcoal pile 156. That is, when in an operational position, the inlet opening 104 may be a greater distance from the fire than the outlet opening 106. In this regard, the blower 100 may remain cool as relatively cool inlet air 128 is drawn into the blower 100 away from the burning charcoal pile 156. In this regard, a constant supply of cool inlet air 128 may be passed through the blower 100 to continually cool the blower assembly 100.

While FIG. 10 depicts the blower 100 in position with respect to a charcoal grill 158, it will be appreciated that the blower 100 may be secured to other structures to accelerate the combustion of other types of fires. For example, the blower 100 may be secured to a smoker, a fireplace, a wood stove, an andiron of a fireplace, near a campfire, near a fire pit, etc. As such, it will be appreciated that the blower 100 may be exposed to conditions associated with outdoor locations. As such, the cylindrical housing 102, clip 132, or other component of the blower 100 may be constructed from stainless steel or other non-corrosive material (e.g., polymers) that may withstand weather and other harsh environments associated with outdoor use. Furthermore, the power source 114 and fan assembly 116 may be electrically insulated to help assist in providing safe operation even when exposed to rain, snow, or other moisture experienced outdoors.

Another embodiment of a blower 200 and clip 232 are depicted in FIGS. 11-15. In general, the blower 200 and clip 232 may include any of the features described above including those features and/or variations described with respect to blower 100 (including blowers 100' and 100" shown in FIGS. 7 and 8) and/or clip 132. In this regard, any of the foregoing discussion regarding blower 100 and/or clip 132 may be equally applicable to blower 200 and clip 232 with the explicit exceptions discussed below.

For instance, unlike blower 100 wherein the power supply 114 is disposed within the bore 108 of the cylindrical housing 102, for the blower 200 a power supply 214 may be disposed remotely from the blower 100. Specifically, a power supply 214 may be incorporated into the clip 232. Accordingly, a power cable 300 (shown in FIGS. 13-15) may be provided that extends between a fan 116 in the blower 200 and the power supply 214 provided in the clip 232.

Additionally, a speed controller 264 may be provided at the clip 232. As described above with respect to speed controller 164, the speed controller 264 may provide a plurality of discrete fan speed settings (e.g., OFF, LOW, HIGH, etc.) or the speed controller 264 may include a continuously variable speed control. In this regard, the speed controller 264 may include an "ON/OFF" selector and a separate speed selector (e.g., that is continuously variable through a range of fan speed settings). Alternatively, the speed selector may include a single selector that varies the speed of the fan 116 from "OFF" through a continuum of or a discrete number of fan speed settings.

The speed controller 264 may be in operative communication with the power supply 214 and the fan 116 to control the speed of operation of the fan 116. The power supply 214 may comprise one or more batteries 248. The batteries 248 may be disposed within one or both of handles 240 of the clip 232. In this regard, at least one of the handles 240 may define a volume 242 for receiving the batteries 248. The batteries 248 may, in an embodiment, be aligned along the longitudinal axis of the batteries 248 along the length of the handles 240

The handle portions 240 may also include removable end caps 244. The end caps 244 may engage an end portion of the handle 240 to retain the batteries 248 within the handle 240. For example, the end caps 244 may be in threaded engagement with respective ones of the end portions of the handles 240. In this regard, the end caps 244 may be removable from the end portions of the handles 244 for removal and/or replacement of the batteries 248. Additionally or alternatively, the clip 232 may also include a rechargeable power supply including, for example, one or more rechargeable batteries. As such, a clip 232 may include a plug connector 126 as shown in FIG. 4 That is, for example, provided on the clip (not shown in FIGS. 11-15).

In any regard, the power supply 214 disposed in the clip 232 may provide power to the fan 116 disposed within the blower 200. For example, a power cable 300 or other appropriate electrical conductor may be provided between the clip 232 and the fan 116 disposed in the blower assembly 200. In an embodiment, the power cable 300 may be provided with the flexible member 112. For example, the power cable 300 may pass within a tubular opening of the flexible member 112. In any regard, the power cable 300 may be in operative communication with the speed controller 264. As such, the batteries 248, when disposed in the handles 240, may interface with or form a part of a power circuit that includes the speed controller 264. As such, the speed controller 264 may be used to regulate delivery of power from the power supply 214 to the fan 116. Alternatively, the power cable 300 may supply power from the power supply 214 to a speed controller disposed the blower 200 (not shown in FIGS. 11 to 15).

In an embodiment, the handles 240 may include a stamped member 250 that forms at least a portion of the handle 240. The stamped member 250 may also define at least a portion of the jaw 134. In an embodiment, the stamped member 250 may be stamped from an electrically conductive material. In this regard, the stamped member 250 may form a portion of the power circuit with which the power supply 214 is engaged. That is, electrical current from the power supply 214 (e.g., the batteries 248) may flow through at least a portion of the stamped member 250 to define at least a portion of the power circuit in the clip 232. Additionally or alternatively, wires, conductive traces, or other electrical communication members may be provided that form a portion of the power circuit for providing power between the power source 214 and the fan 116. In any regard, the stamped member 250 may be stamped sheet material so as to reduce the manufacturing costs associated with the manufacturer of the clip 232.

A housing 252 may be provided that coordinates with the stamped member 250 to at least partially define the handles 240. That is, the housing 252 may attach to the stamped member 250 (e.g., by way of fasteners or the like). In this regard, the housing portion 252 may at least partially define the volume 242 in which the batteries 248 are retained. The housing 252 may also at least partially enclose the power circuitry used to communicate electrical power between the batteries 248 and the speed controller 264. The housing 252 may comprise a heat insulation material 242 and may assist in maintaining the handle portions 240 at a relatively low temperature when disposed adjacent to a fire. The housing 252 may also include contouring grip portions 260 adapted for engagement with the hand/fingers of a user.

Figure 15:
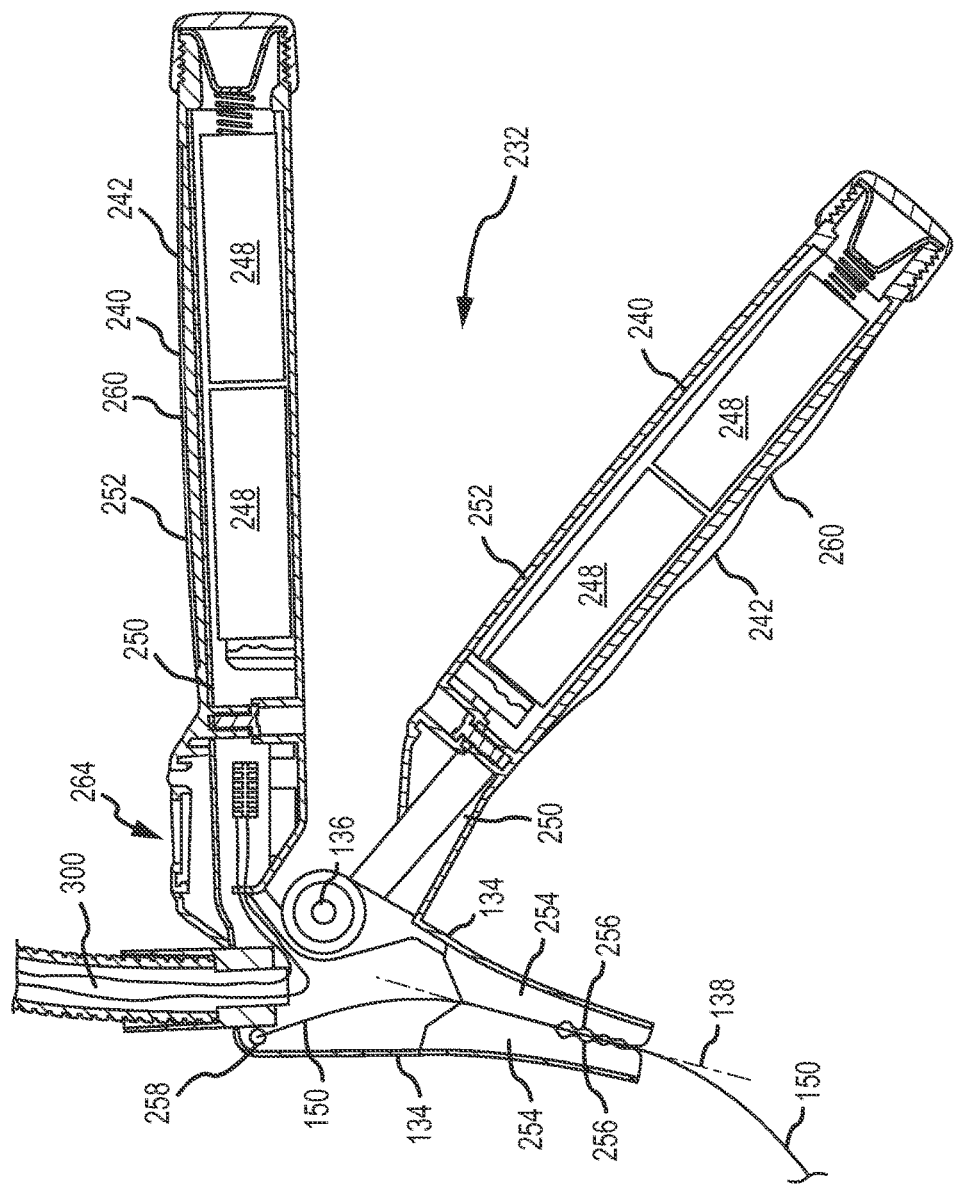
FIG. 15 depicts a cross sectional view of the clip of the embodiment of FIG. 11.

As depicted in FIG. 15, the jaws 134 may include coordinating engagement surfaces 256 defined by opposing resilient portions 254. The resilient portions 254 may be engaged with respective ones of the jaws 134. The resilient portions 254 may be made from a resilient material to assistant gripping engagement between a structure engaged between the engagement surfaces 256. For example, the resilient portions 254 may include high-temperature silicone, rubber, polymer, or other material that may withstand relatively high temperatures at the engagement surfaces 256 and assist in engagement of the structure disposed between the jaws 134. Furthermore, the resilient portions 254 may help prevent the clip 232 from scratching a structure with which the clip 232 is engaged (e.g., such as a grill sidewall 150 shown in FIG. 10).

Furthermore, the shape of the jaw members 134 may assist in retaining the clip 232 relative to a structure. In this regard, at least one of the jaws 134 may include a recessed portion 258. The recessed portion 258 may be integrally defined by a portion of the jaw 134. The recessed portion 258 may be disposed away from the engagement surfaces 256 of the jaws 134 (i.e., where the jaws 134 clampingly engage a structure). The recessed portion 258 may be sized and positioned to receive a portion of a structure to which the clip 232 is secured as shown in FIG. 15. For example, in the event the clip 232 is secured to a grill sidewall 150, a portion of the grill sidewall 150 may be received in the recessed portion 258 of the jaw 134 as shown in FIG. 15. In this regard, the weight of the handles 240 may cause the clip 232 to pivot relative to the grill sidewall 150 such that the recessed portion 258 creates an interference between the grill sidewall 150 and the jaw 134 so as to assist in retention of the clip 232 relative to the grill sidewall 150. That is, the weight of the handles may cause the grill sidewall 150 to engage a cam surface defined by the recessed portion 258 to prevent further movement of the clip 232 with respect to the grill sidewall 150. The shape of the recessed portion 258, may therefore be contoured so as to provide such engagement with a relatively wide variety of grill sidewall 150 profiles. Alternatively, the recessed portion 258 may be specifically shaped with respect to a specific grill sidewall 150 profile such that a grill-specific clip 232 may be provided.

Figure 16:
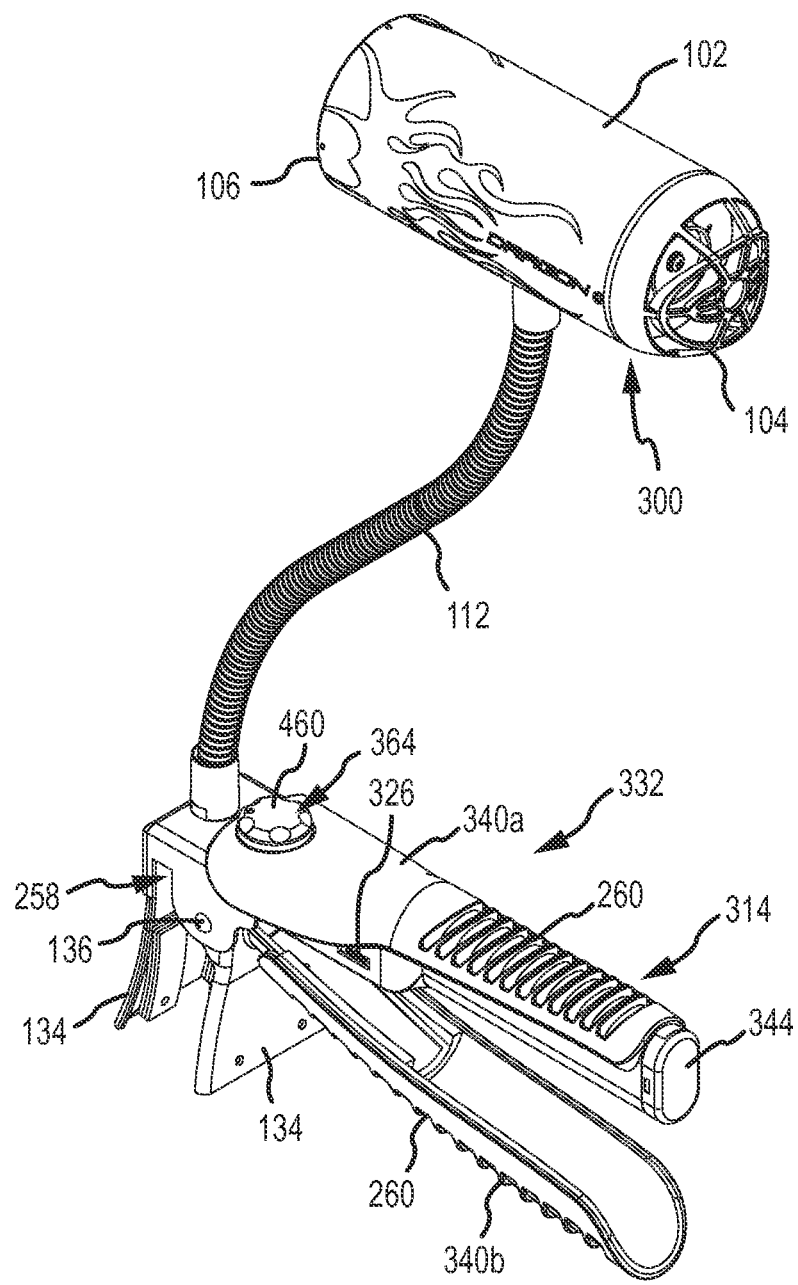
FIG. 16 depicts a perspective view of another embodiment of a blower.
Figure 17:
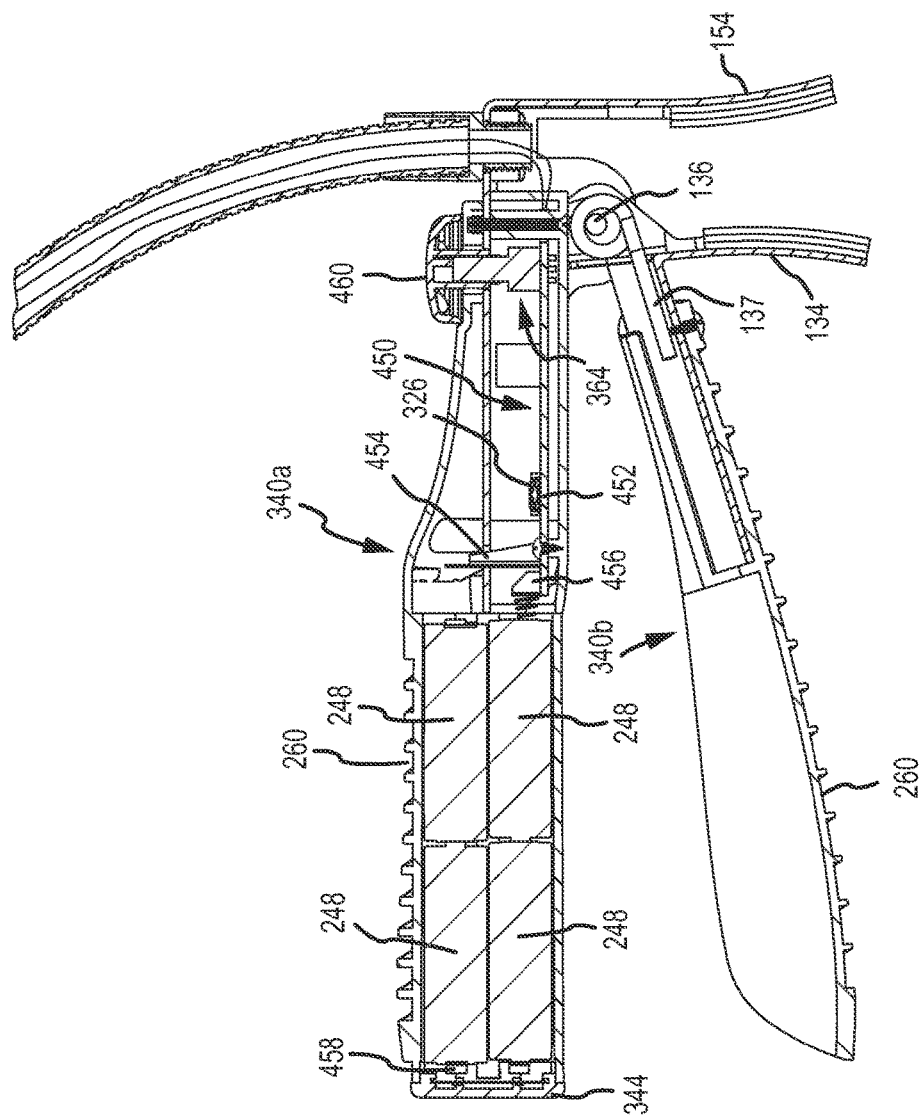
FIG. 17 depicts a cross sectional view of a handle of the embodiment of FIG. 16.

Another embodiment of a blower 300 and clip 332 are depicted in FIGS. 16-17. In general, the blower 300 and clip 332 may include any of the features described above including those features and/or variations described with respect to blower 100 (including blowers 100' and 100" shown in FIGS. 7 and 8), blower 200, clip 132, and/or clip 232. In this regard, any of the foregoing discussion regarding blower 100/200 and/or clip 132/232 may be equally applicable to blower 300 and clip 332 with the explicit exceptions discussed below.

In this regard, like the embodiment of the blower 200 and clip 232, the blower 300 and clip 332 shown in FIG. 16 may include a power source that is remote from the blower 300 (e.g., integrated into the clip 332). As such, the clip 332 may include a first handle 340a and a second handle 340b. The first handle 340a may house a power supply 314 (e.g., batteries 248 as shown in FIG. 17). The second handle 340b may be attached to the first handle 340a at a pivot 136. In this regard and as described above, manipulation of the handles 340a and 340b may result in opening of the jaw members 134 (e.g., against the biasing force of biasing spring 137) to facilitate attachment of the clip 332 and blower 300 to a structure.

Handle 340a may also house a speed controller 364 and/or control circuitry 450 (best seen in FIG. 17) used to control the speed of a fan disposed in the blower 300. In this regard, housing 340a may include a printed circuit board (PCB) 452. The PCB 452 may establish communication between the power source 314 and the speed controller 364 to facilitate control of the speed of the fan in the blower 300. In this regard, the PCB 452 may include a first battery terminal 454 and a second battery terminal 456 that form part of a power circuit. That is, the batteries 248 (e.g., four batteries 248 shown in FIG. 17, although additional or fewer batteries 248 could be provided) may be in contact with respective ones of the first battery terminal 454 and the second battery terminal 456. An end cap 344 disposed at the end portion of the first handle 340a may include a conductive member 458 in contact with respective ones of the batteries 248. In this regard, the first battery terminal 454, batteries 248 disposed in series between the first battery terminal 454 and the conductive member 458, conductive member 458, batteries 248 disposed in series between the conductive member 458 and the second battery terminal 456, and second battery terminal 456 may form a closed power circuit that delivers power from the batteries 248 to the PCB 452.

In turn, the speed controller 364 may be in operative communication on the PCB 452 to receive the power from the power circuit. As shown, the speed controller 364 may include a rotary knob 460 disposed on an outer portion of the first handle 340a. The rotary knob 460 may be manipulated by a user to control the speed controller 364 (e.g., comprising a potentiometer) to vary the speed of the fan. As described above, a power cable 300 may establish electrical communication between the PCB 452 and a fan disposed remotely in the blower 300. Furthermore, PCB 452 may facilitate electrical communication with a plug connector 452 that may be used to recharge batteries 248 or otherwise provide power to the blower 300. The plug connector 452 may comprise any type of plug known in the art including, for example, a standard type power connector (e.g., mini-USB, USB, or other standard connector) or may comprise a proprietary type connector.

As described with respect to end cap 244, end cap 344 may be selectively removable from the first handle 340a to access the batteries 248 housed within the first handle 340a. In this regard, once the end cap 344 is removed, the batteries 248 may be removed and replaced. The end cap 344 may be in threaded engagement, may clip to, or otherwise be selectively removably attachable to the handle portion 340a to facilitate convenient removal of the end cap 344.

A number of additional features may be provided in various embodiments of a blower assembly. For example, a light (e.g., a LED) may be provided with a blower assembly 100/200/300. The light may be disposed within the cylindrical housing 102 and be operable to shine light in the direction of the flow of air out of the outlet opening 106. As such, when a blower assembly 100/200/300 is positioned to direct air toward a fire, the light may illuminate a field downstream of the blower assembly 100/200/300. Additionally, a power meter and/or alarm may be provided to provide an indication of when a power supply 114/214/314 is running low on power. Thus, a user may be alerted that the power supply 114/214/314 is in need of charging. Furthermore, the clip 132/232/332 may integrate one or more magnets to assist in attaching the clip 132/232/332 to a structure (e.g., a ferromagnetic structure). In one embodiment, rather than jaws 134 described above, a magnet alone may be used to attach a blower 100/200/300 and flexible member 112 to a structure. Further still, while not depicted in the figures, an integrated bottle opener may also be provided. For example, the bottle opener may be disposed at the clip 132/232/332 such as, for example, at the end portion of one of the handles 140/240/340.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A charcoal grill system operable to provide combustion air to a fire of a charcoal pile, the charcoal grill system comprising:
   a charcoal grill, comprising the charcoal pile, which is positioned inside the charcoal grill; and
   an electric blower, which is secured to the charcoal grill, the electric blower comprising:
     a cylindrical housing defining a bore extending from an inlet opening of the housing to an outlet opening of the housing, wherein the bore extends along at least a portion of a central axis of the cylindrical housing;
     a fan disposed within the bore between the inlet opening and the outlet opening, the fan having an axis of rotation substantially coaxial with the central axis;
     a flexible member operatively connected to the cylindrical housing for supportive engagement of the cylindrical housing by the flexible member;
     a clip, operatively engaged with an end of the flexible member opposite the cylindrical housing for selective attachment of the electric blower to a support structure, wherein the clip comprises:
       a clamp having opposing first and second jaws pivotal about a hinge, wherein the first jaw extends in a first direction and the second jaw extends in a second direction;
       a first handle, operatively engaged with the first jaw, extending in a third direction, wherein the third direction is different than the first direction;
       a second handle, operatively engaged with the second jaw, extending in a fourth direction, wherein the fourth direction is different than the second direction; and
       a power source disposed within the clip and in operative communication with the fan to power the fan, wherein the power source comprises at least one battery, wherein the at least one battery is disposed within a volume defined by at least one of the first and second handles;
     wherein the first and second handles are configured to extend away from a centerline of a jaw opening between the first and second jaws, such that the first and second handles extend to an outer side of a sidewall of the charcoal grill, whereby the first and second handles are at least partially shielded from the fire;
     wherein the fan is rotatable about the axis of rotation to induce air flow through the bore between the inlet opening and the outlet opening such that air is expelled from the outlet opening in a direction substantially parallel with the central axis and the cylindrical housing is positionable with respect to the charcoal pile to direct air toward the fire.

2. The charcoal grill system according to claim 1, wherein the flexible member is manipulable to position the cylindrical housing with respect to the fire so as to direct air exiting the outlet opening toward the fire.

3. The charcoal grill system according to claim 2, wherein the cylindrical housing is positionable at least with respect to one of translation of the cylindrical housing in a direction transverse to the central axis, translation of the cylindrical housing in a direction along the central axis, or rotation of the cylindrical housing about a rotation axis transverse to the central axis.

4. The charcoal grill system according to claim 3, wherein the flexible member is adjustable to define a continuum of blower positions absent preset positions.

5. The charcoal grill system according to claim 1, wherein a power cable extends from the clip to the fan.

6. The charcoal grill system according to claim 5, wherein the power cable extends along the flexible member.

7. The charcoal grill system according to claim 1, wherein the at least one battery is rechargeable.

8. The charcoal grill system according to claim 1, wherein the inlet opening is disposed at a first end portion of the cylindrical housing and the outlet opening is disposed at a second end portion of the cylindrical housing opposite the first end portion.

9. The charcoal grill system according to claim 8, wherein when the cylindrical housing is positioned with respect to the fire so as to direct air exiting the outlet opening toward the fire, the inlet opening is disposed further from the fire than the outlet opening.

10. The charcoal grill system according to claim 9, wherein the inlet opening comprises substantially the entire cross sectional area of the cylindrical housing at the first end portion and the outlet opening comprises substantially the entire cross sectional area of the cylindrical housing at the second end portion.

11. The charcoal grill system according to claim 10, wherein the outlet opening is smaller than the inlet opening.

12. The charcoal grill system according to claim 1, wherein the cylindrical housing comprises stainless steel.

13. The charcoal grill system according to claim 1, wherein the cylindrical housing comprises aluminum.

14. The charcoal grill system according to claim 1, further comprising a fan controller in operative communication with the fan that is operable to control the speed of the fan.

15. The charcoal grill system according to claim 14, wherein the fan controller provides continuously variable control over the speed of the fan.

16. The charcoal grill system according to claim 14, wherein the fan controller is disposed in the clip.

17. The charcoal grill system according to claim 1, wherein:
   the clip comprises a recessed portion adaptable to receive a portion of a structure with which the clip is engaged;
   the recessed portion comprises a cam surface for engaging the portion of the structure to resist movement of the clip relative to the structure; and
   the weight of the handles pivots the cam surface in contacting engagement with the portion of the structure.

18. The charcoal grill system according to claim 1, wherein the handles comprise a stamped portion.

19. The charcoal grill system according to claim 18, wherein a housing is attachably engaged with the stamped portion.

20. The charcoal grill system according to claim 1, wherein:
a portion of the flexible member adjacent the clip extends in a fifth direction away from the clip; one of the handles extends in a sixth direction substantially perpendicular to the fifth direction; and one of the opposing jaws is in a fixed relation to the one of the handles and extends in a seventh direction substantially perpendicular to the sixth direction.

21. A charcoal grill system operable to provide combustion air to a fire of a charcoal pile, the charcoal grill system comprising:
a charcoal grill, comprising the charcoal pile, which is positioned inside the charcoal grill; and
an electric blower, comprising:
a clip for attachment to a structure of the charcoal grill adjacent to the charcoal pile, wherein the clip comprises:
a first handle, extending in a first direction:
a second handle, extending in a second direction;
first and second jaws;
a power source integrally provided with the clip, wherein the power source comprises at least one battery, wherein the at least one battery is disposed within a volume defined by at least one of the first and second handles; and
a blower supportably engaged with the clip and comprising a fan in electrical communication with the power source;
wherein the first and second handles are configured to extend away from a centerline of a jaw opening between the first and second jaws, such that the first and second handles extend to an outer side of a sidewall of the charcoal grill, whereby the first and second handles are at least partially shielded from the fire;
wherein the blower is selectively positionable independent from the clip to direct air toward the fire in response to operation of the fan.

22. A charcoal grill system operable to provide combustion air to a fire of a charcoal pile, the charcoal grill system comprising:
a charcoal grill, comprising the charcoal pile, which is positioned inside the charcoal grill; and
an electric blower, which is secured to the charcoal grill, the electric blower comprising:
a cylindrical housing defining a bore extending from an inlet opening of the housing to an outlet opening of the housing, wherein the bore extends along at least a portion of a central axis of the cylindrical housing; a fan disposed within the bore between the inlet opening and the outlet opening, the fan having an axis of rotation substantially coaxial with the central axis; a flexible member operatively connected to the cylindrical housing for supportive engagement of the cylindrical housing by the flexible member; a clip comprising a clamp, operatively engaged with an end of the flexible member opposite the cylindrical housing for selective attachment of the electric blower to a support structure of the charcoal grill, wherein the clamp comprises opposing first and second jaws that are pivotal about a hinge and the clamp comprises handles; and a power source disposed within at least one of the first and second handles and in operative communication with the fan to power the fan; wherein the first and second handles are configured to extend away from a centerline of a jaw opening between the first and second jaws, such that the first and second handles extend to an outer side of a sidewall of the charcoal grill, whereby the first and second handles are at least partially shielded from the fire; wherein the fan is rotatable about the axis of rotation to induce air flow through the bore between the inlet opening and the outlet opening such that air is expelled from the outlet opening in a direction substantially parallel with the central axis and the cylindrical housing is positionable with respect to the charcoal pile to direct air toward the fire of the charcoal pile.

* * * * *